US010663386B2

United States Patent
Kravitz et al.

(10) Patent No.: US 10,663,386 B2
(45) Date of Patent: May 26, 2020

(54) CONTROLLING A VIBRATION OF A VIBRATORY SENSOR BASED ON A PHASE ERROR

(71) Applicant: Micro Motion, Inc., Boulder, CO (US)

(72) Inventors: Andrew S Kravitz, Frederick, CO (US); Craig B McAnally, Thornton, CO (US)

(73) Assignee: Micro Motion, Inc., Boulder, CO (US)

( * ) Notice: Subject to any disclaimer, the term of this patent is extended or adjusted under 35 U.S.C. 154(b) by 335 days.

(21) Appl. No.: 15/528,902

(22) PCT Filed: Jul. 9, 2015

(86) PCT No.: PCT/US2015/039761
§ 371 (c)(1),
(2) Date: May 23, 2017

(87) PCT Pub. No.: WO2016/099603
PCT Pub. Date: Jun. 23, 2016

(65) Prior Publication Data
US 2017/0343458 A1 Nov. 30, 2017

Related U.S. Application Data

(60) Provisional application No. 62/094,217, filed on Dec. 19, 2014.

(51) Int. Cl.
*G01N 11/16* (2006.01)
*G01N 29/036* (2006.01)
(Continued)

(52) U.S. Cl.
CPC ............. *G01N 11/16* (2013.01); *G01N 9/002* (2013.01); *G01N 11/00* (2013.01); *G01N 29/022* (2013.01);
(Continued)

(58) Field of Classification Search
CPC .. G01N 11/00; G01N 11/16; G01N 2009/006; G01N 29/022; G01N 29/036;
(Continued)

(56) References Cited

U.S. PATENT DOCUMENTS 4,533,346 A   8/1985  Cosgrove, Jr. et al.
5,223,778 A   6/1993  Svarovsky et al.
(Continued)

FOREIGN PATENT DOCUMENTS

RU     2376556 C1    12/2009
WO  2007035376 A2     3/2007
(Continued)

*Primary Examiner* — Kyle R Quigley
(74) *Attorney, Agent, or Firm* — The Ollila Law Group LLC (57) ABSTRACT

A method of controlling a vibration of a vibratory element based on a phase error is provided. The method includes vibrating the vibratory element with a drive signal, receiving a vibration signal from the vibratory element, measuring a phase difference between the drive signal and the vibration signal, determining a phase error between a target phase difference and the measured phase difference, and calculating one or more vibration control terms with the determined phase error.

18 Claims, 8 Drawing Sheets

(51) Int. Cl.
*G01N 11/00* (2006.01)
*G01N 29/02* (2006.01)
*G01N 9/00* (2006.01)
*G06F 17/11* (2006.01)

(52) U.S. Cl.
CPC .......... *G01N 29/036* (2013.01); *G06F 17/11* (2013.01); *G01N 2009/006* (2013.01)

(58) Field of Classification Search
CPC ......... G01N 9/002; G06F 17/11; G05B 11/42; G05B 13/042
See application file for complete search history.

(56) References Cited

U.S. PATENT DOCUMENTS

| | | | |
|---|---|---|---|
| 2008/0141787 A1* | 6/2008 | Friedrichs | G01F 1/8436 73/861.354 |
| 2010/0083750 A1 | 4/2010 | D Angelico | |
| 2010/0161251 A1* | 6/2010 | D'Angelico | G01F 23/2967 702/54 |
| 2013/0106477 A1* | 5/2013 | Urban | G01F 23/2966 327/156 |

FOREIGN PATENT DOCUMENTS

| | | | |
|---|---|---|---|
| WO | 2014175902 A1 | 10/2014 | |
| WO | 2014176122 A1 | 10/2014 | |

\* cited by examiner

FIG. 8

CONTROLLING A VIBRATION OF A VIBRATORY SENSOR BASED ON A PHASE ERROR

TECHNICAL FIELD

The embodiments described below relate to vibratory sensors and, more particularly, to controlling a vibration of a vibratory sensor based on a phase error.

BACKGROUND

Vibratory sensors, such as vibratory densitometers and vibratory viscometers, operate by detecting motion of a vibrating element that vibrates in the presence of a fluid to be characterized. The vibratory element has a vibration response that may have a vibration response parameter such as a resonant frequency or quality factor Q. The vibration response of the vibrating element is generally affected by the combined mass, stiffness, and damping characteristics of the vibrating element in combination with the fluid. Properties associated with the fluid, such as density, viscosity, temperature and the like, can be determined by processing a vibration signal received from one or more motion transducers associated with the vibrating element. The processing of the vibration signal may include determining the vibration response parameter.

Figure 1:
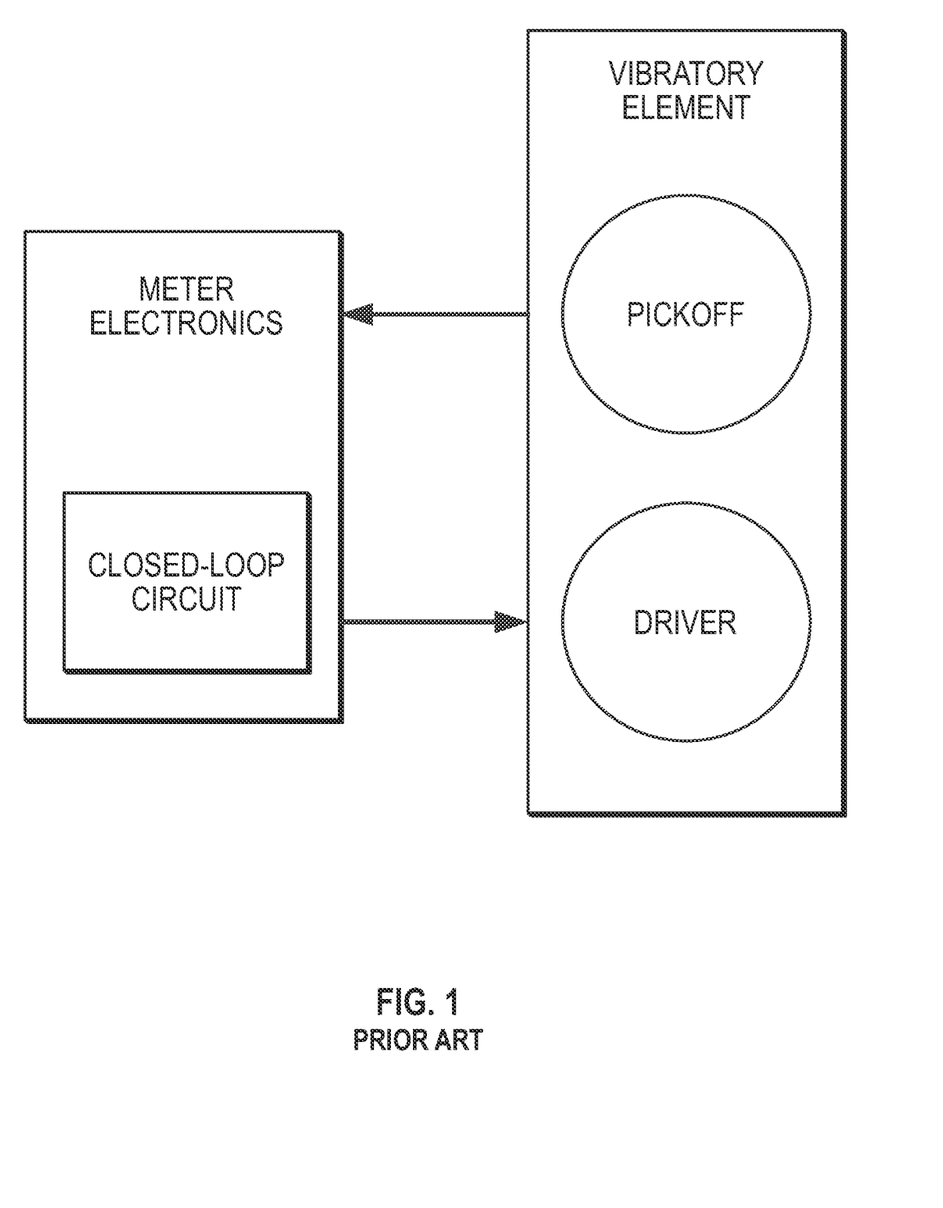
FIG. 1 shows a prior art vibratory sensor comprising a vibratory element and meter electronics coupled to the vibratory element.

FIG. 1 shows a prior art vibratory sensor comprising a vibratory element and meter electronics coupled to the vibratory element. The prior art vibratory sensor includes a driver for vibrating the vibratory element and a pickoff that creates a vibration signal in response to the vibration. The vibration signal is typically a continuous time or analog signal. The meter electronics receives the vibration signal and processes the vibration signal to generate one or more fluid characteristics or fluid measurements. The meter electronics determines both the frequency and the amplitude of the vibration signal. The frequency and amplitude of the vibration signal can be further processed to determine a density of the fluid.

The prior art vibratory sensor provides a drive signal for the driver using a closed-loop circuit. The drive signal is typically based on the received vibration signal. The prior art closed-loop circuit modifies or incorporates the vibration signal or parameters of the vibration signal into the drive signal. For example, the drive signal may be an amplified, modulated, or an otherwise modified version of the received vibration signal. The received vibration signal can therefore comprise a feedback that enables the closed-loop circuit to achieve a target frequency. Using the feedback, the closed-loop circuit incrementally changes the drive frequency and monitors the vibration signal until the target frequency is reached.

Fluid properties, such as the viscosity and density of the fluid, can be determined from the frequencies where the phase difference between the drive signal and the vibration signal is 135° and 45°. These desired phase differences, denoted as first off-resonant phase difference $\phi_1$ and second off-resonant phase difference $\phi_2$, can correspond to the half power or 3 dB frequencies. The first off-resonant frequency $\omega_1$ is defined as a frequency where the first off-resonant phase difference $\phi_1$ is 135°. The second off-resonant frequency $\omega_2$ is defined as a frequency where the second off-resonant phase difference $\phi_2$ is 45°. Density measurements made at the second off-resonant frequency $\omega_2$ can be independent of fluid viscosity. Accordingly, density measurements made where the second off-resonant phase difference $\phi_2$ is 45° can be more accurate than density measurements made at other phase differences.

The first and second off-resonant phase differences $\phi_1$, $\phi_2$ are typically not known prior to measurement. Accordingly, the closed-loop circuit must incrementally approach the first and second off-resonant phase differences $\phi_1$, $\phi_2$ using the feedback as described in the foregoing. The incremental approach associated with the closed-loop circuit can cause a delay in determining the vibration response parameter and, therefore, cause a delay in determining the viscosity, density, or other properties of the fluid. The delays in determining such measurements can be prohibitively expensive in many applications of the vibratory sensor.

Accordingly, there is a need for controlling a vibration of a vibratory sensor based on a phase error. There is also a need for reaching the first and second off-resonant phase difference $\phi_1$, $\phi_2$ without the delays associated with the closed-loop circuit.

SUMMARY

A method of controlling a vibration of a vibratory element based on a phase error is provided. According to an embodiment, the method comprises vibrating the vibratory element with a drive signal, receiving a vibration signal from the vibratory element, and measuring a phase difference between the drive signal and the vibration signal. The method also comprises determining a phase error between a target phase difference and the measured phase difference and calculating one or more vibration control terms with the determined phase error.

A meter electronics for controlling a vibration of a vibratory element is provided. According to an embodiment, the meter electronics comprises a driver circuit coupled to the vibratory element, the driver circuit configured to provide a drive signal to a vibratory element. The meter electronics also comprises a receiver circuit coupled to the vibratory element, the receiver circuit configured to receive a vibration signal from the vibratory element. The meter electronics is configured to measure a phase difference between the drive signal and the vibration signal, determine a phase error between a target phase difference and the measured phase difference, and calculate one or more vibration control terms with the determined phase error.

Aspects

According to an aspect, a method of controlling a vibration of a vibratory element based on a phase error comprises vibrating the vibratory element with a drive signal, receiving a vibration signal from the vibratory element, measuring a phase difference between the drive signal and the vibration signal, determining a phase error between a target phase difference and the measured phase difference, and calculating one or more vibration control terms with the determined phase error.

Preferably, the one or more vibration control terms is a term in a proportional-integral control loop.

Preferably, the step of determining the phase error comprises calculating the phase error based on the equation:

$$\text{phase error} = \frac{\text{target phase difference} - \text{measured phase difference}}{\text{target phase difference}}.$$

Preferably, the one or more vibration control terms is a proportional gain term for the proportional-integral control loop that receives the determined phase error.

Preferably, the proportional gain term is calculated based on the equation:

proportional gain=determined phase error×Kp, wherein Kp is a proportional gain constant.

Preferably, the vibration control term is an integral term for a control loop that receives the determined phase error.

Preferably, the integral term is calculated based on the equation:

integral term=integral term+determined phase error× Ki, wherein Ki is an integral term constant.

Preferably, the method further comprises generating a command frequency based on the determined phase error and providing the command frequency to a signal generator that is configured to generate the drive signal that vibrates the vibratory element at the command frequency.

Preferably, the command frequency is generated using the integral term and the proportional gain term.

Preferably, the command frequency is generated using the integral term and the proportional gain term by adding the integral term and the proportional gain term based on the equation:

command frequency=integral term+proportional gain term.

According to an aspect, a meter electronics (20) for controlling a vibration of a vibratory element (104) comprises a driver circuit (138) coupled to the vibratory element (104), the driver circuit (138) configured to provide a drive signal to a vibratory element (104) and a receiver circuit (134) coupled to the vibratory element (104), the receiver circuit (134) configured to receive a vibration signal from the vibratory element (104). The meter electronics (20) is configured to measure a phase difference between the drive signal and the vibration signal, determine a phase error between a target phase difference and the measured phase difference, and calculate one or more vibration control terms with the determined phase error.

Preferably, the one or more vibration control terms is a term in a proportional-integral control loop.

Preferably, the meter electronics (20) configured to determine the phase error comprises the meter electronics (20) being configured to calculate the phase error based on the equation:

$$\text{phase error} = \frac{\text{target phase difference} - \text{measured phase difference}}{\text{target phase difference}}.$$

Preferably, the one or more vibration control terms is a proportional gain term for the proportional-integral control loop that receives the determined phase error.

Preferably, the proportional gain term is calculated based on the equation:

proportional gain=determined phase error×Kp, wherein Kp is a proportional gain constant.

Preferably, the vibration control term is an integral term for a control loop that receives the determined phase error.

Preferably, the integral term is calculated based on the equation:

integral term=integral term+determined phase error× Ki, wherein Ki is an integral term constant.

Preferably, the meter electronics (20) is further configured to generate a command frequency ($\omega_c$) based on the determined phase error and provide the command frequency ($\omega_c$) to a signal generator (147c) that is configured to generate the drive signal that vibrates the vibratory element (104) at the command frequency ($\omega_c$).

Preferably, the command frequency ($\omega_c$) is generated using the integral term and the proportional gain term.

Preferably, the command frequency ($\omega_c$) is generated using the integral term and the proportional gain term by adding the integral term and the proportional gain term based on the equation:

command frequency=integral term+proportional gain term.

BRIEF DESCRIPTION OF THE DRAWINGS

The same reference number represents the same element on all drawings. It should be understood that the drawings are not necessarily to scale.

DETAILED DESCRIPTION

FIGS. 1-8 and the following description depict specific examples to teach those skilled in the art how to make and use the best mode of embodiments for controlling a vibration of a vibratory sensor based on a phase error. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of controlling a vibration of a vibratory sensor based on a phase error. As a result, the embodiments described below are not limited to the specific examples described below, but only by the claims and their equivalents.

Figure 2:
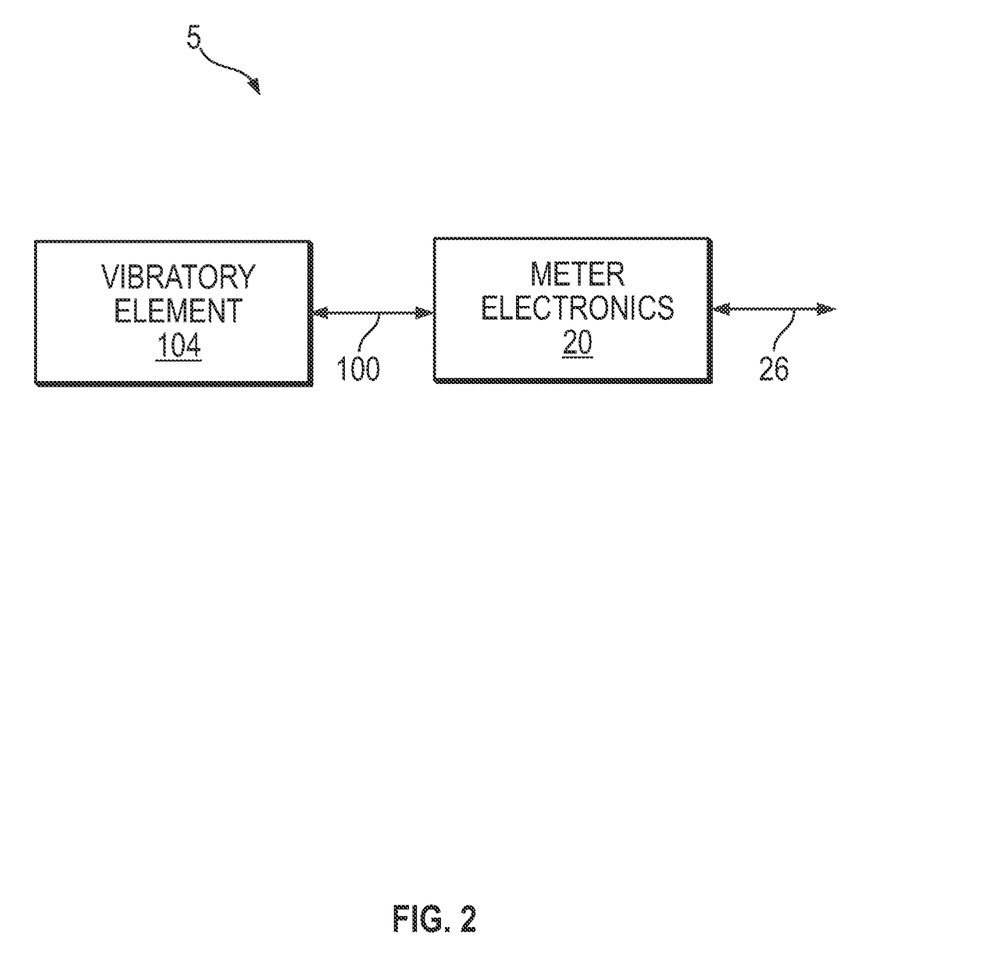
FIG. 2 shows a vibratory sensor 5 according to an embodiment.

FIG. 2 shows a vibratory sensor 5 according to an embodiment. The vibratory sensor 5 may comprise a vibratory element 104 and meter electronics 20, wherein the vibratory element 104 is coupled to the meter electronics 20 by a lead or leads 100. In some embodiments, the vibratory sensor 5 may comprise a vibratory tine sensor or fork density sensor (see FIG. 3 and the accompanying discussion). However, other vibratory sensors are contemplated and are within the scope of the description and claims.

The vibratory sensor 5 may be at least partially immersed into a fluid to be characterized. The fluid can comprise a liquid or a gas. Alternatively, the fluid can comprise a multi-phase fluid, such as a liquid that includes entrained gas, entrained solids, multiple liquids, or combinations thereof. Some exemplary fluids include cement slurries, petroleum products, or the like. The vibratory sensor 5 may be mounted in a pipe or conduit, a tank, a container, or other fluid vessels. The vibratory sensor 5 can also be mounted in a manifold or similar structure for directing a fluid flow. However, other mounting arrangements are contemplated and are within the scope of the description and claims.

The vibratory sensor 5 operates to provide fluid measurements. The vibratory sensor 5 may provide fluid measurements including one or more of a fluid density and a fluid viscosity for a fluid, including flowing or non-flowing fluids. The vibratory sensor 5 may provide fluid measurements including a fluid mass flow rate, a fluid volume flow rate, and/or a fluid temperature. This listing is not exhaustive and the vibratory sensor 5 may measure or determine other fluid characteristics.

The meter electronics 20 can provide electrical power to the vibratory element 104 via the lead or leads 100. The meter electronics 20 controls operation of the vibratory element 104 via the lead or leads 100. For example, the meter electronics 20 may generate a drive signal and provide the generated drive signal to the vibratory element 104, wherein the vibratory element 104 generates a vibration in one or more vibratory components using the generated drive signal. The generated drive signal can control the vibrational amplitude and frequency of the vibratory element 104. The generated drive signal can also control the vibrational duration and/or vibrational timing.

The meter electronics 20 can also receive a vibration signal or signals from the vibratory element 104 via the lead or leads 100. The meter electronics 20 may process the vibration signal or signals to generate a density measurement, for example. The meter electronics 20 processes the vibration signal or signals received from the vibratory element 104 to determine a frequency of the signal or signals. Further, or in addition, the meter electronics 20 processes the vibration signal or signals to determine other characteristics of the fluid, such as a viscosity or a phase difference between signals, that can be processed to determine a fluid flow rate, for example. As can be appreciated, the phase difference is typically measured or expressed in spatial units such as degrees or radians although any suitable unit can be employed such as time-based units. If time-based units are employed, then the phase difference may be referred to by those in the art as a time-delay between the vibration signal and the drive signal. Other vibrational response characteristics and/or fluid measurements are contemplated and are within the scope of the description and claims.

The meter electronics 20 can be further coupled to a communication link 26. The meter electronics 20 may communicate the vibration signal over the communication link 26. The meter electronics 20 may also process the received vibration signal to generate a measurement value or values and may communicate the measurement value or values over the communication link 26. In addition, the meter electronics 20 can receive information over the communication link 26. For example, the meter electronics 20 may receive commands, updates, operational values or operational value changes, and/or programming updates or changes over the communication link 26.

Figure 3:
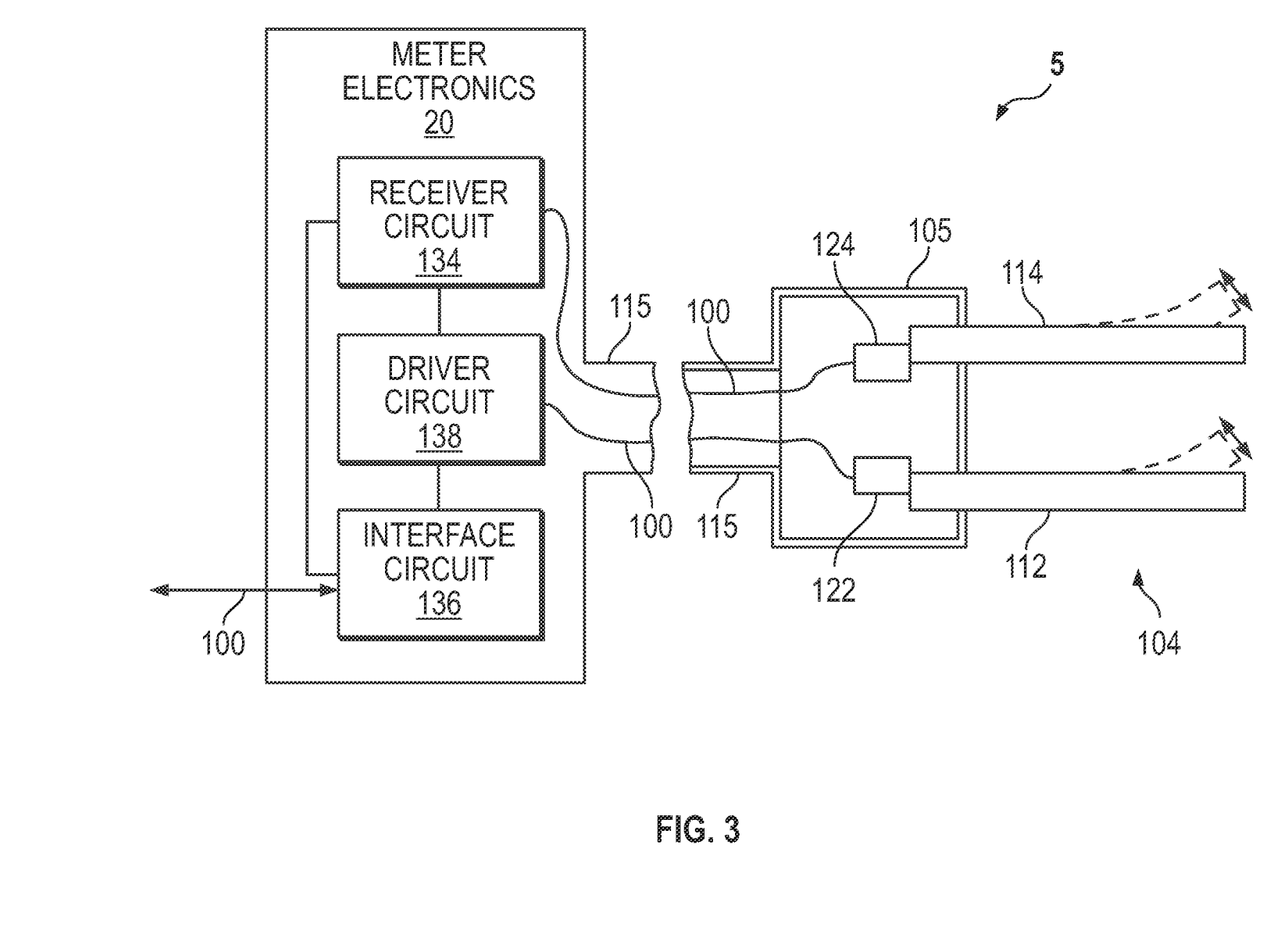
FIG. 3 shows the vibratory sensor 5 according to an embodiment.

FIG. 3 shows the vibratory sensor 5 according to an embodiment. The meter electronics 20 is coupled to the vibratory element 104 by a shaft 115 in the embodiment shown. The shaft 115 may be of any desired length. The shaft 115 may be at least partially hollow. Wires or other conductors may extend between the meter electronics 20 and the vibratory element 104 through the shaft 115. The meter electronics 20 includes circuit components such as a receiver circuit 134, an interface circuit 136, and a driver circuit 138. In the embodiment shown, the receiver circuit 134 and the driver circuit 138 are directly coupled to the leads of the vibratory element 104. Alternatively, the meter electronics 20 can comprise a separate component or device from the vibratory element 104, wherein the receiver circuit 134 and the driver circuit 138 are coupled to the vibratory element 104 via the lead or leads 100.

In the embodiment shown, the vibratory element 104 of the vibratory sensor 5 comprises a tuning fork structure, wherein the vibratory element 104 is at least partially immersed in the fluid being measured. The vibratory element 104 includes a housing 105 that can be affixed to another structure, such as a pipe, conduit, tank, receptacle, manifold, or any other fluid-handling structure. The housing 105 retains the vibratory element 104 while the vibratory element 104 remains at least partially exposed. The vibratory element 104 is therefore configured to be immersed in the fluid.

The vibratory element 104 in the embodiment shown includes first and second tines 112 and 114 that are configured to extend at least partially into the fluid. The first and second tines 112 and 114 comprise elongated elements that may have any desired cross-sectional shape. The first and second tines 112 and 114 may be at least partially flexible or resilient in nature. The vibratory sensor 5 further includes corresponding first and second piezo elements 122 and 124 that comprise piezo-electric crystal elements. The first and second piezo elements 122 and 124 are located adjacent to the first and second tines 112 and 114, respectively. The first and second piezo elements 122 and 124 are configured to contact and mechanically interact with the first and second tines 112 and 114.

The first piezo element 122 is in contact with at least a portion of the first tine 112. The first piezo element 122 is also electrically coupled to the driver circuit 138. The driver circuit 138 provides the generated drive signal to the first piezo element 122. The first piezo element 122 expands and contracts when subjected to the generated drive signal. As a result, the first piezo element 122 may alternatingly deform and displace the first tine 112 from side to side in a vibratory motion (see dashed lines), disturbing the fluid in a periodic, reciprocating manner.

The second piezo element 124 is shown as coupled to a receiver circuit 134 that produces the vibration signal corresponding to the deformations of the second tine 114 in the fluid. Movement of the second tine 114 causes a corresponding electrical vibration signal to be generated by the second piezo element 124. The second piezo element 124 transmits the vibration signal to the meter electronics 20. The meter electronics 20 includes the interface circuit 136.

The interface circuit 136 can be configured to communicate with external devices. The interface circuit 136 communicates a vibration measurement signal or signals and may communicate determined fluid characteristics to one or more external devices. The meter electronics 20 can transmit vibration signal characteristics via the interface circuit 136, such as a vibration signal frequency and a vibration signal amplitude of the vibration signal. The meter electronics 20 may transmit fluid measurements via the interface circuit 136, such as a density and/or viscosity of the fluid, among other things. Other fluid measurements are contemplated and are within the scope of the description and claims. In addition, the interface circuit 136 may receive communications from external devices, including commands and data for generating measurement values, for example. In some embodiments, the receiver circuit 134 is coupled to the driver circuit 138, with the receiver circuit 134 providing the vibration signal to the driver circuit 138.

The driver circuit 138 generates the drive signal for the vibratory element 104. The driver circuit 138 can modify characteristics of the generated drive signal. The driver circuit 138 includes an open-loop drive. The open-loop drive may be used by the driver circuit 138 to generate the drive signal and supply the generated drive signal to the vibratory element 104 (e.g., to the first piezo element 122). In some embodiments, the open-loop drive generates the drive signal to achieve a target phase difference $\phi_t$, commencing at an initial frequency $\omega_i$. The open-loop drive may not operate based on feedback from the vibration signal, as will be described in more detail in the following with reference to FIG. 4.

Figure 4:
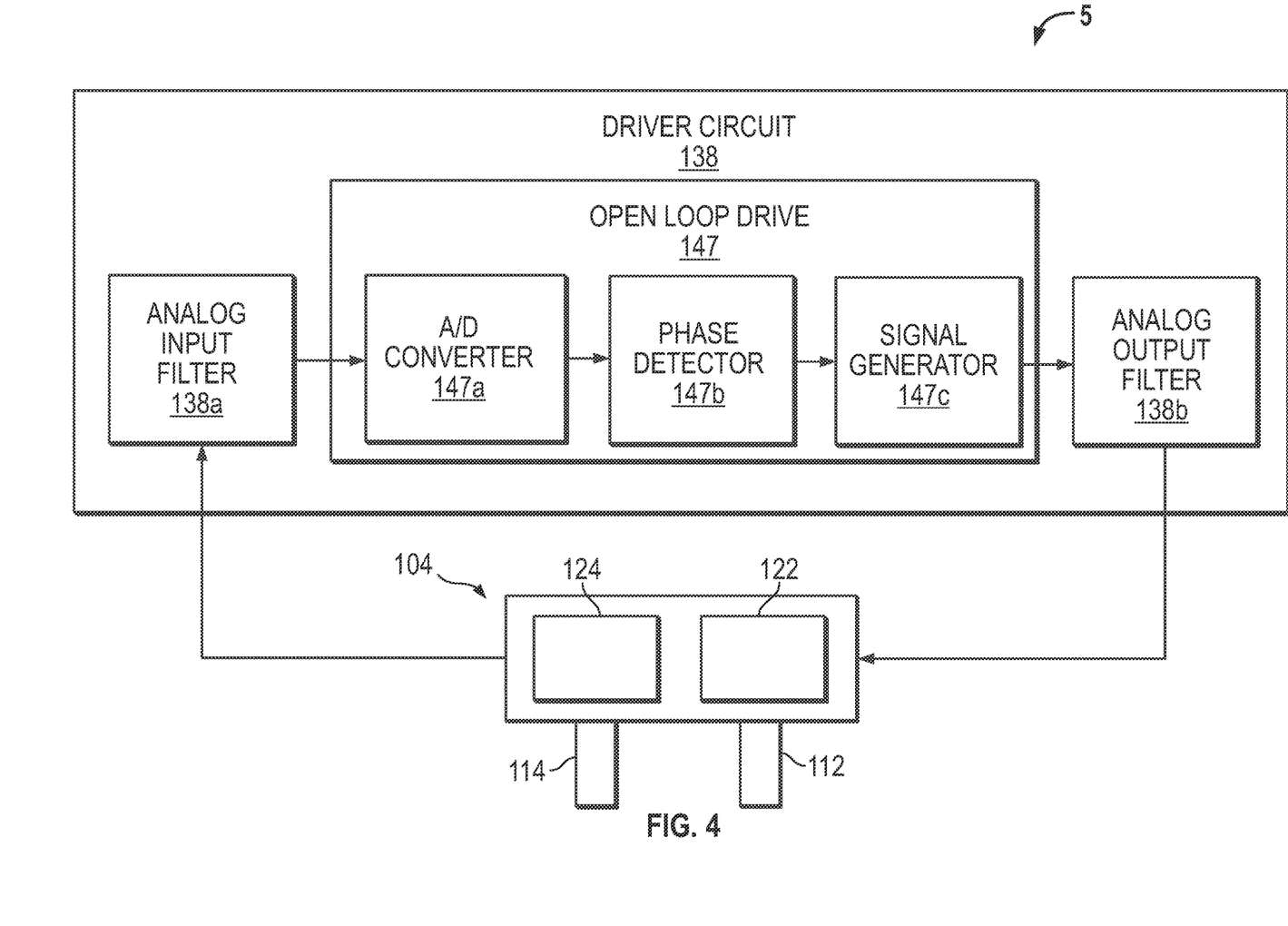
FIG. 4 shows a block diagram of the vibratory sensor 5 with a more detailed representation of the driver circuit 138.

FIG. 4 shows a block diagram of the vibratory sensor 5 with a more detailed representation of the driver circuit 138. The vibratory sensor 5 is shown with the driver circuit 138. The receiver circuit 134 and the interface circuit 136 are not shown for clarity. The driver circuit 138 includes an analog input filter 138a and an analog output filter 138b that are coupled to the open-loop drive 147. The analog input filter 138a filters the vibration signal and the analog output filter 138b filters the generated drive signal.

The open-loop drive 147 includes an analog to digital converter 147a that is coupled to a phase detector 147b. The phase detector 147b is coupled to a signal generator 147c. Also shown is the vibratory element 104, which includes the first piezo element 122 and the second piezo element 124. The open-loop drive 147 can be implemented with a digital signal processor that is configured to execute one or more codes or programs that sample, process, and generate signals. Additionally or alternatively, the open-loop drive 147 can be implemented with an electronics circuit coupled to the digital signal processor, or the like.

The vibration signal provided by the first piezo element 122 is sent to the analog input filter 138a. The analog input filter 138a filters the vibration signal prior to the vibration signal being sampled by the analog to digital converter 147a. In the embodiment shown, the analog input filter 138a can be comprised of a low pass filter with cutoff frequency that is about half the sample rate of the open-loop drive 147 although any suitable low pass filter can be employed. The low pass filter can be provided by passive components such as an inductor, a capacitor, and a resistor, although any suitable components, distributed or discrete, such as an operational amplifier filter, can be employed.

The analog to digital converter 147a can sample the filtered vibration signal to form a sampled vibration signal. The analog to digital converter 147a can also sample the generated drive signal through a second channel (not shown). The sampling can be by any appropriate sampling method. As can be appreciated, the generated drive signal sampled by the analog to digital converter 147a does not have noise associated with the vibration signal. The generated drive signal is provided to the phase detector 147b.

The phase detector 147b can compare the phases of the sampled vibration and generated drive signals. The phase detector 147b can be a processor configured to execute one or more codes or programs that sample, process, and generate signals to detect a phase difference between two signals, as will be described in more detail in the following with reference to FIG. 5. Still referring to the embodiment of FIG. 4, the comparison provides a measured phase difference $\phi_m$ between the sampled vibration signal and the sampled generated drive signal.

The measured phase difference $\phi_m$ is compared with the target phase difference $\phi_t$. The target phase difference $\phi_t$ is a desired phase difference between the vibration signal and the generated drive signal. For example, in an embodiment where the target phase difference $\phi_t$ is approximately 45°, the difference between the measured phase difference $\phi_m$ and the target phase difference $\phi_t$ can be zero if the measured phase difference $\phi_m$ is also the same as or about 45°. However, any appropriate target phase difference $\phi_t$ can be employed in alternative embodiments. Using the comparison between the measured phase difference $\phi_m$ and the target phase difference $\phi_t$, the phase detector 147b can generate a command frequency $\omega_c$.

The command frequency $\omega_c$ can be employed to generate the drive signal. Additionally or alternatively, an initial frequency $\omega_i$ that is not determined from the comparison between the measured phase difference $\phi_m$ and the target phase difference $\phi_t$ can be employed. The initial frequency $\omega_i$ could be a preselected frequency used to form an initial generated drive signal. The initial generated drive signal can be sampled as described in the foregoing and compared with the sampled vibration signal. The comparison between the sampled initial generated drive signal and the sampled vibration signal can be used to generate the command frequency $\omega_c$. The command frequency $\omega_c$ and the initial frequency $\omega_i$ can have units of radians per second although any suitable units, such as, for example, Hertz (Hz), can be employed. The command frequency $\omega_c$ or the initial frequency $\omega_i$ can be provided to the signal generator 147c.

The signal generator 147c can receive the command frequency $\omega_c$ from the phase detector 147b and provide the generated drive signal with a frequency that is the same as the command frequency $\omega_c$. The generated drive signal may be sent, as discussed in the foregoing, to the analog to digital converter 147a. The generated drive signal is also sent to the first piezo element 122 via the analog output filter 138b. Additionally or alternatively, the generated drive signal can be sent to other components in other embodiments.

As discussed in the foregoing, the vibratory element 104 has a vibration response due to the drive signal. The vibration response has vibration response parameters, such as a resonant frequency $\omega 0$, quality factor Q, or the like, which can be employed to calculate various properties of the fluid being measured. The vibration response and exemplary vibration response parameters, as well as how the vibration response parameters can be used to calculate the properties of the fluid, are discussed in more detail in the following.

Figure 5:
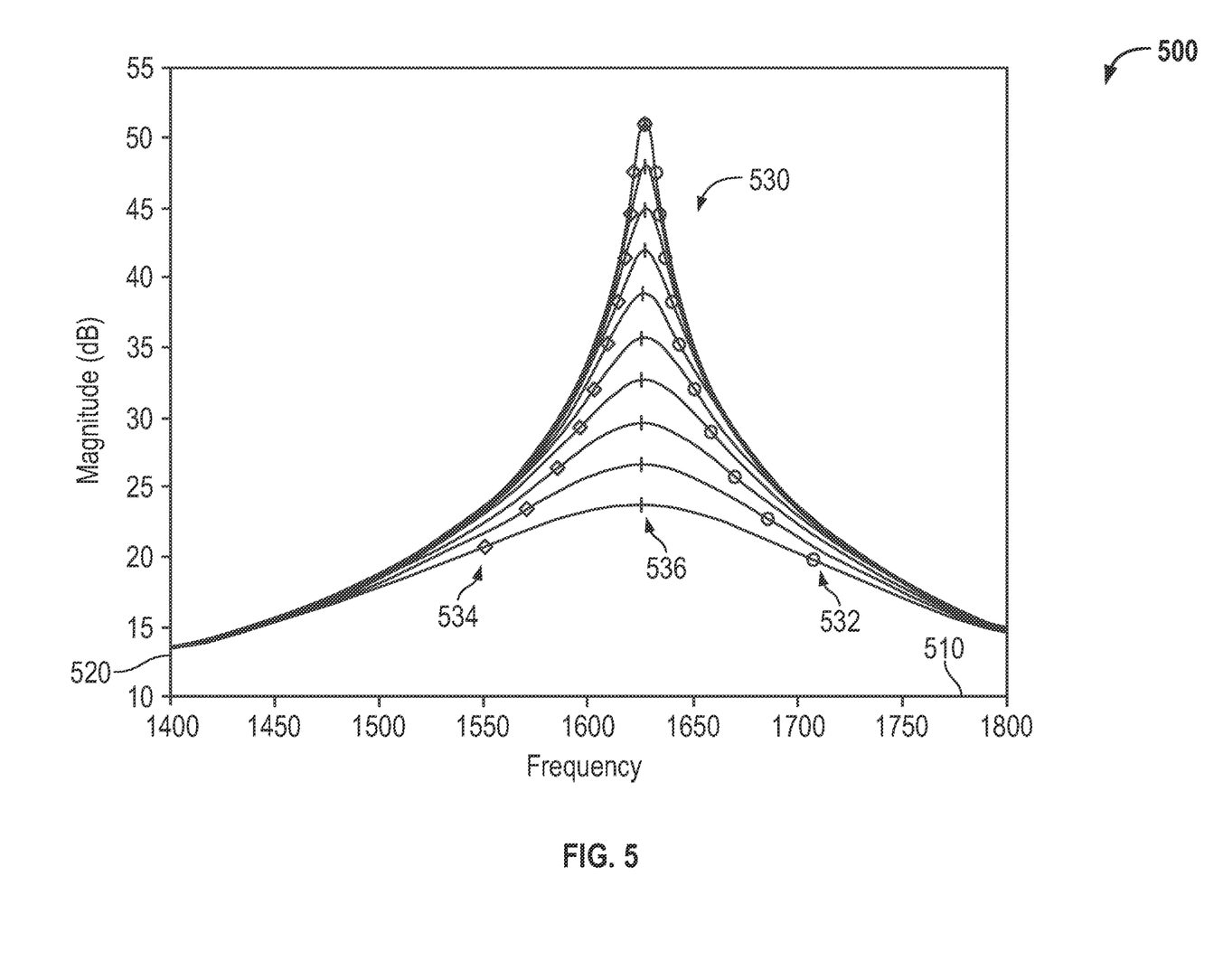
FIG. 5 shows a frequency response graph 500 illustrating a vibration response of a vibratory element.

FIG. 5 shows a frequency response graph 500 illustrating a vibration response of a vibratory element. The frequency response graph 500 includes a frequency axis 510 and a magnitude axis 520. The frequency axis 510 is shown in units of Hz although any suitable frequency unit may be employed, such as, for example, radians per second. The magnitude axis 520 is shown with a decibel (dB) scale. The magnitude axis 520 can be determined from any appropriate unit, such as, for example, volts or amps. The frequency response graph 500 also includes frequency response plots 530. The frequency response plots 530 may represent the vibration responses of the vibratory element 104 described in the foregoing, although any suitable vibratory element may be employed in alternative embodiments.

As shown in FIG. 5, the frequency response plots 530 are comprised of individual frequency response plots for fluids with different vibration damping properties. For example, the plot with the lowest magnitude at the resonant frequency may be the flattest due to the vibratory element 104 being immersed in a viscous and dense fluid. The plot with the largest magnitude at the resonant frequency may be the least flat due to the vibratory element being immersed in a fluid with low viscosity relative to the fluids associated with the other plots in the frequency response plots 530. As can be appreciated, each of the frequency response plots 530 has different associated vibration response parameters.

For example, in the embodiment shown in FIG. 5, each of the frequency response plots 530 has three markers which indicate a first off-resonant frequency ω1, second off-resonant frequency ω2, and resonant frequency ω0, which are the vibration response parameters of a vibration response. The first off-resonant frequency ω1 is indicated by a first off-resonant marker 532. The second off-resonant frequency ω2 is indicated by a second off-resonant marker 534. The resonant frequency ω0 is indicated by a resonant marker 536. As can be appreciated by referring to the resonant markers 536, the resonant frequency ω0 is substantially the same for each of the frequency response plots 530.

In some embodiments, the resonant frequency ω0 may be determined from the first off-resonant frequency ω1 and the second off-resonant frequency ω2. For example, the resonant frequency ω0 can be determined from an average of the first off-resonant frequency ω1 and the second off-resonant frequency ω2:

$$\omega 0 = \frac{(\omega 1 + \omega 2)}{2}. \quad (1)$$

However, in alternative embodiments, the resonant frequency ω0 can be determined in other ways, such as measuring the frequency at peak magnitude while sweeping a range of frequencies.

The quality factor Q can be determined from the first off-resonant frequency ω1, the second off-resonant frequency ω2, and the resonant frequency ω0. For example, the quality factor Q can be determined from:

$$Q = \frac{\omega 0}{(\omega 1 - \omega 2)}. \quad (2)$$

As can be appreciated, the quality factor Q is different for each curve. The quality factor Q may be different for each of the frequency response plots 530 due to various reasons, such as, for example, the fluid associated with each of the frequency response plots 530 having different viscosity or density.

Figure 6:
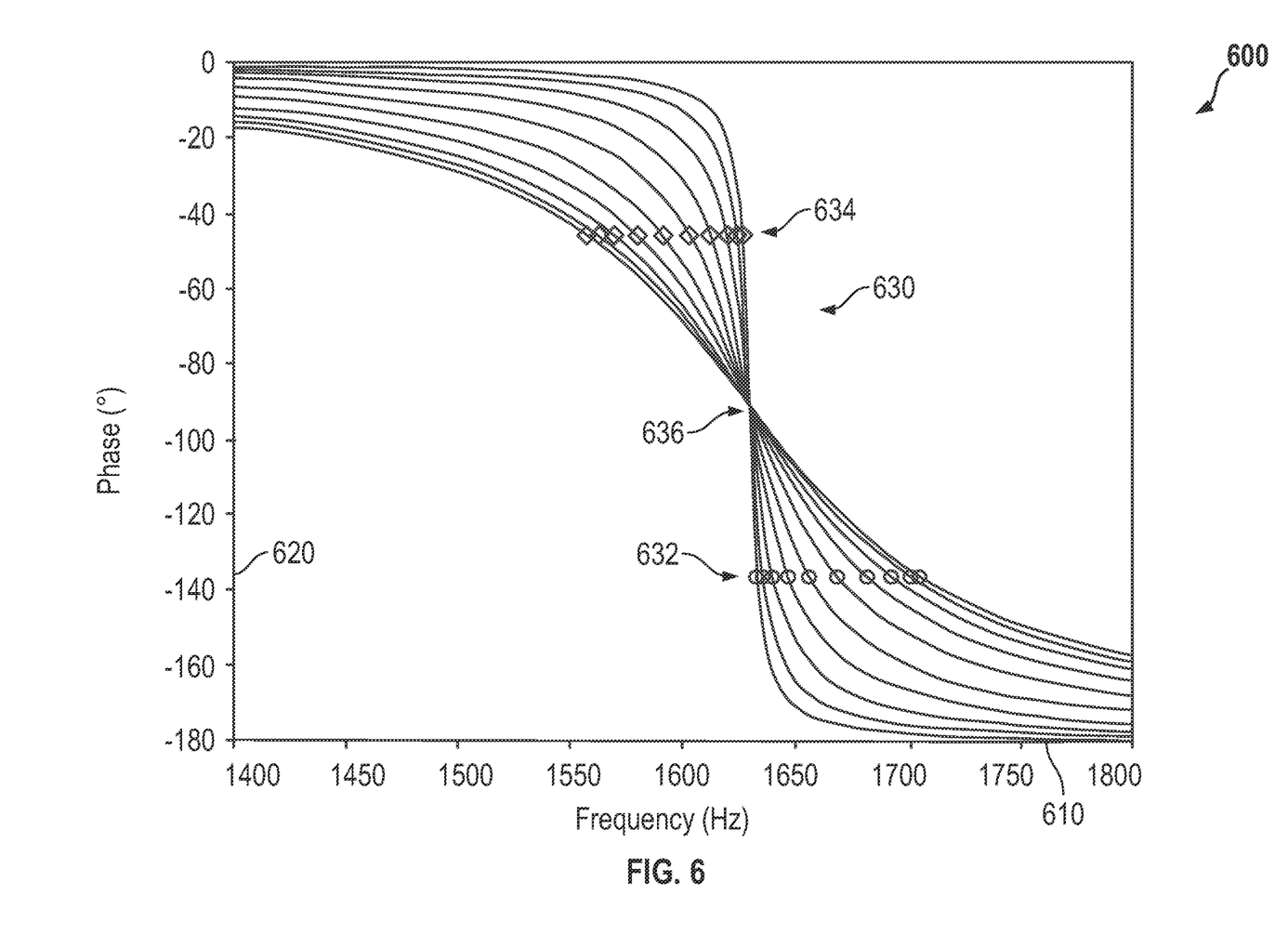
FIG. 6 shows a phase response graph 600 illustrating a vibration response of a vibratory element.

FIG. 6 shows a phase response graph 600 illustrating a vibration response of a vibratory element. The vibratory element may be the vibratory element 104 described in the foregoing with reference to FIGS. 2-4, although any suitable vibratory element may be employed. The phase response graph 600 includes a frequency axis 610, which is an abscissa of the phase response graph 600. The phase response graph 600 also includes a phase difference axis 620, which is an ordinate of the phase response graph 600. The phase response graph 600 includes phase response plots 630 for fluids of different viscosities. Each of the phase response plots 630 has a first off-resonant marker 632 and a second off-resonant marker 634. Also shown is the resonant marker 636 of each of the phase response plots 630.

Each of the phase response plots 630 illustrate a relationship between a frequency of a vibration signal and a phase difference between the vibration signal and a drive signal. The frequency of the first and second off-resonant markers 632, 634 differ for each of the phase response plots 630. As shown, the first off-resonant markers 632 at −135 degrees range from about 1630 Hz to about 1715 Hz. The second off-resonant markers 634 at −45 degrees range from about 1560 Hz to about 1620 Hz.

As can be appreciated, the relationship between the phase difference and the frequency is approximately linear between the first and second off-resonant markers 632, 634. Therefore, a functional relationship between the frequency and phase difference may be established if two or more phase differences are measured at their respective frequencies. The functional relationship can be employed to determine a phase error between a target phase difference $\phi_t$ and the measured phase difference $\phi_m$, as was described in the foregoing with reference to FIG. 4. As will be described in more detail in the following, the phase error can be employed to calculate one or more vibration control terms for a control loop.

Figure 7:
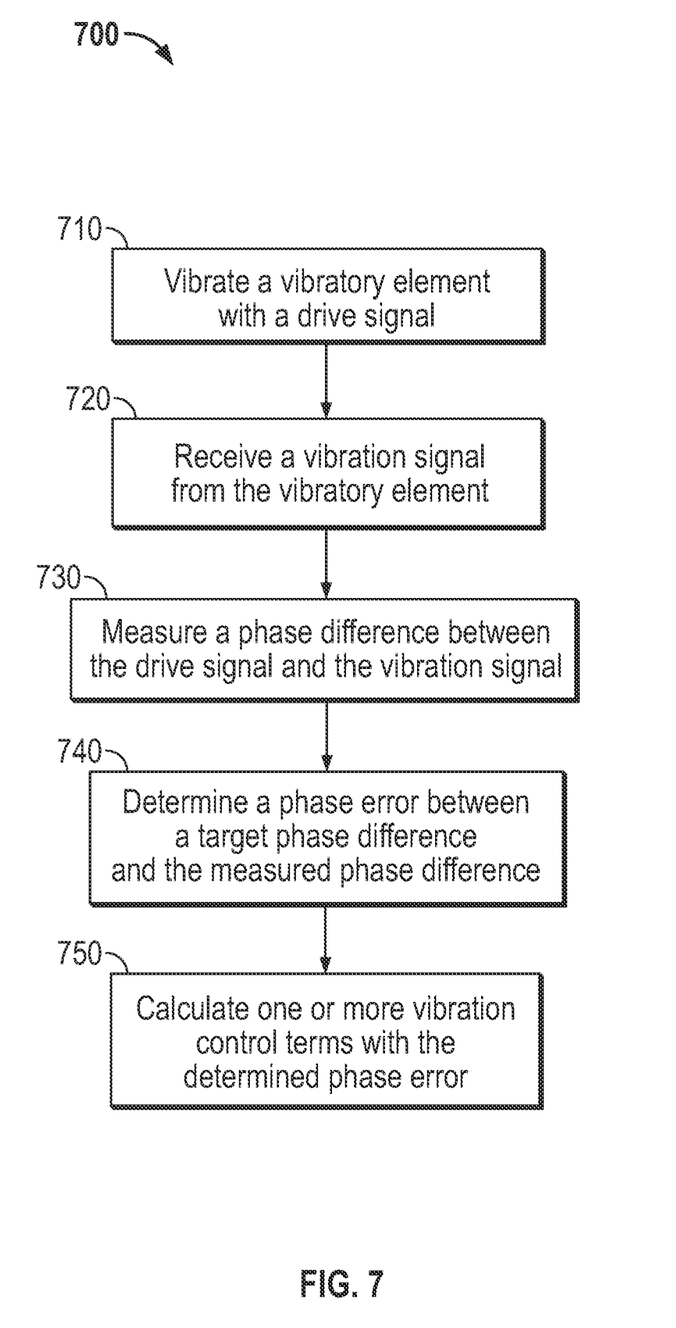
FIG. 7 shows a method 700 of controlling a vibration in a vibratory element based on a phase error.

FIG. 7 shows a method 700 of controlling a vibration in a vibratory element based on a phase error. The vibratory element may be the vibratory element 104 described in the foregoing with reference to FIGS. 2-4, although any suitable vibratory element may be employed in alternative embodiments. The method 700 begins by vibrating the vibratory element with a drive signal in step 710. The drive signal may be generated by, for example, the driver circuit 138 described with reference to FIG. 4.

In step 720, the method 700 receives a vibration signal from the vibratory element. The method 700 may receive the signal with, for example, the meter electronics 20. In particular, the method 700 may be a program that executes on the meter electronics 20 to cause the receiver circuit 134 to receive the vibration signal carried by the leads 100 shown in FIG. 3.

In step 730, the method 700 can measure a phase difference $\phi_m$ between the drive signal and the vibration signal. The method 700 can measure the phase difference $\phi_m$ with, for example, the phase detector 147b, although any suitable means can be employed to measure the phase difference $\phi_m$. In step 740, a phase error between a target phase difference $\phi_t$ and the measured phase difference $\phi_m$ can be determined. The phase error can be determined by, for example, subtracting the difference between the target phase difference $\phi_t$ and the measured phase difference $\phi_m$.

In step 750, the method 700 can calculate one or more vibration control terms with the determined phase error. The vibration control terms may be terms employed in, for example, a control loop that controls the vibration of the vibratory element. For example, the method 700 may be employed in a driver circuit, such as the open-loop drive 147 described in the foregoing. Accordingly, the method 700 may vibrate the vibratory element at a frequency that is calculated from the determined phase error, as is described in more detail in the following.

Figure 8:
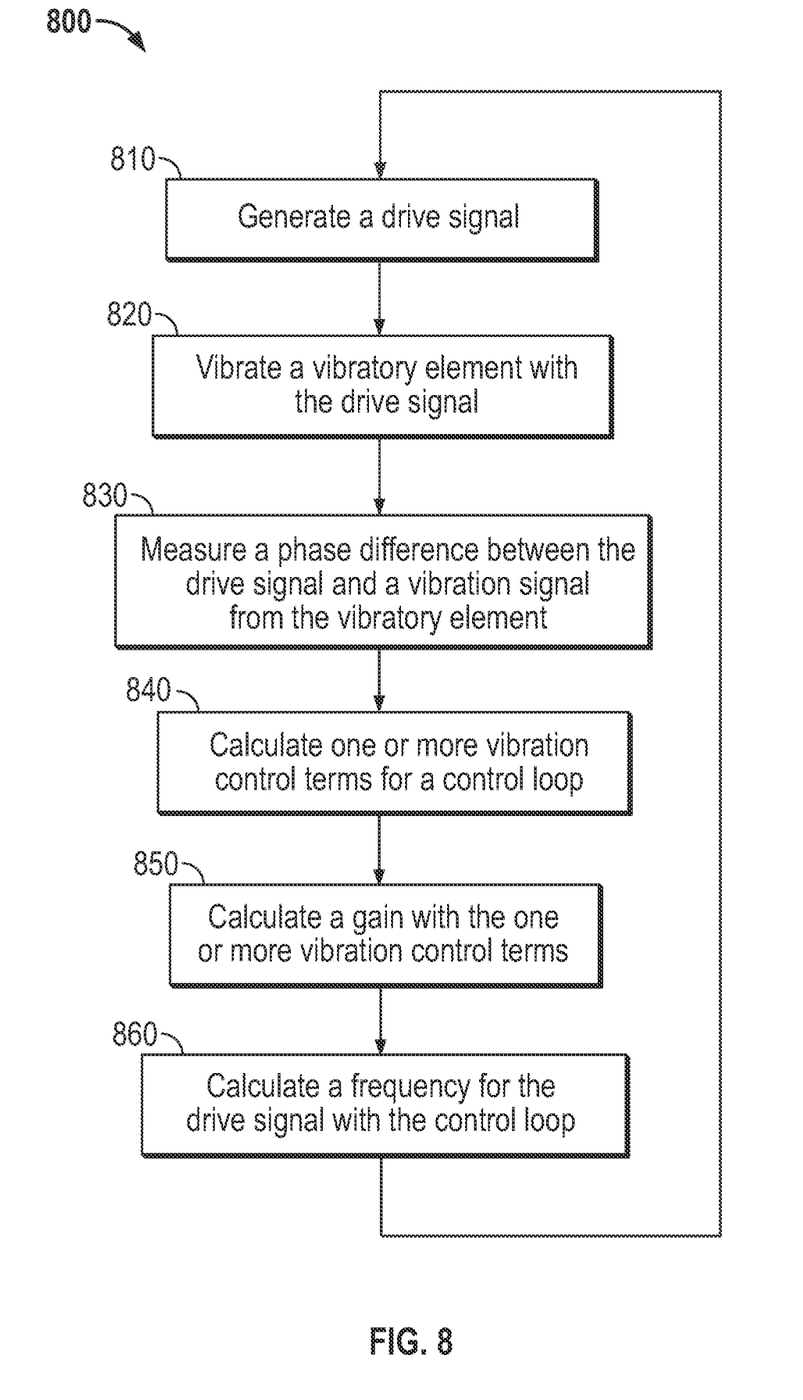
FIG. 8 shows another method 800 of controlling a vibration in a vibratory element based on a phase error.

FIG. 8 shows another method 800 of controlling a vibration in a vibratory element based on a phase error. The vibratory element may be the vibratory element 104 described in the foregoing with reference to FIGS. 2-4, although any suitable vibratory element may be employed. The method 800 begins in step 810 by generating a drive signal. The drive signal may be generated by the signal generator 147c described with reference to FIG. 4. In step 820, the method 800 may vibrate the vibratory element with the drive signal. For example, according to the embodiment shown in FIG. 8, the method 800 could cause the signal generator 147c to provide the drive signal to the vibratory element 104 via the analog output filter 138b.

In step 830, the method 800 measures a phase difference between the drive signal and the vibration signal from the vibratory element. In step 840, the method 800 may calculate one or more vibration control terms from a control loop. In step 850, the method 800 may calculate a gain with the one or more vibration control terms. In step 860, the method 800 can calculate a frequency for the drive signal with the control loop. The method 800 is shown as looping back to step 810 to generate the drive signal, which may have the frequency calculated in step 860.

The methods 700, 800 can perform the foregoing described steps by, for example, executing a software program on the meter electronics 20. The methods 700, 800 described in the foregoing can measure a phase difference between the drive signal and the vibration signal, determine a phase error between a target phase difference $\phi_t$ and the measured phase difference $\phi_m$, and calculate one or more vibration control terms with the determined phase error. These and other steps are described in more detail in the following.

The phase difference between the drive signal and the vibration signal can be measured in various ways. For example, the phase difference could be measured by sampling the drive signal and the vibration signal with the analog to digital converter 147a. The phase detector 147b could detect the zero crossing points of the drive signal and the vibration signal. The zero crossing points may be the time at which the drive signal and the vibration signal are at or about zero volts, in analog form or digitally encoded. The time difference between the zero crossing points of the drive signal and the vibration signal may be multiplied by the frequency of the drive or vibration signal to calculate the measured phase difference $\phi_m$. However, any suitable means of measuring the phase difference between the drive signal and the vibration signal may be employed.

The phase error can be determined from the measured phase difference $\phi_m$. The phase error may be a ratio of the difference between the target phase difference $\phi_t$ and the measured phase difference $\phi_m$ divided by target phase difference $\phi_t$. Accordingly, the difference between the target phase difference $\phi_t$ and the measured phase difference $\phi_m$ may be scaled relative to the target phase difference $\phi_t$. For example, the meter electronics 20 may execute the methods 700, 800 to calculate the phase error by using the equation:

$$\text{phase error} = \frac{\text{target phase difference} - \text{measured phase difference}}{\text{target phase difference}}. \quad (3)$$

In these and other embodiments, the determined phase error can be employed to calculate the one or more vibration control terms. For example, the phase error may be multiplied with a value, such as, for example, a predetermined constant to calculate one of the vibration control terms.

The vibration control terms can be employed in a control loop that generates a gain. For example, the control loop may add the one or more vibration control terms to generate a gain. The gain can be employed to control the vibration of the vibratory element, such as, for example, the vibratory element 104 described in the foregoing with reference to FIG. 1. For example, the gain can be employed to drive the vibratory element to the first or second off-resonant phase differences $\phi1$, $\phi2$.

By driving the vibratory element to the first and second off-resonant phase differences $\phi1$, $\phi2$, the phase error between the measured phase difference $\phi_m$ and the target phase difference $\phi_t$ decreases. That is, the target phase difference $\phi_t$ may be one of the first or second off-resonant phase differences $\phi1$, $\phi2$. The reduced phase error can be used to calculate corresponding vibration control terms for the control loop. Accordingly, the control loop can incrementally reduce the gain calculated by the control loop in an incremental process as the measured phase difference $\phi_m$ gets closer to the target phase difference $\phi_t$.

The control loop may be a proportional-integral control loop with vibration control terms that are calculated from the determined phase error. In an embodiment, the proportional-integral control loop may be comprised of, for example, a sum of a proportional gain term and an integral term. In some embodiments, the proportional-integral control loop is described by an equation that multiples the determined phase error with a proportional gain constant Kp and an integral term constant Ki, as will be described in more detail in the following.

The proportional gain term may be the proportional gain constant Kp multiplied with the determined phase error. In an embodiment, the proportional gain term may be calculated from equation:

$$\text{proportional gain term} = \text{phase error} \times Kp. \quad (4)$$

The phase error in the equation may be the determined phase error. For example, the phase error in the equation may be determined from the measured phase difference $\phi_m$ as the drive signal and the vibration signal are received from the vibratory element 104.

The proportional gain term may be employed in the proportional-integral control loop. Accordingly, the output of the proportional-integral control loop may be correlated with the determined phase error. Accordingly, the greater the difference between the measured phase difference $\phi_m$ and the target phase difference $\phi_t$, the greater the output from the proportional-integral control loop. Therefore, large determined phase errors result in the proportional gain term being correspondingly large, relative to the scale determined by the proportional gain constant Kp.

The proportional-integral control loop may also include the integral term. The integral term may be the integral term constant Ki multiplied by the determined phase error. In addition, the integral term can also include other determined phase errors. For example, as described in the foregoing, the phase error may be determined iteratively. Accordingly, the integral term constant Ki may be multiplied with a present phase error and one or more prior phase errors to determine a present integral term for the proportional-integral control loop.

For example, the methods 700, 800 may store one or more prior phase errors in the meter electronics 20. The one or more prior phase errors may be obtained by the methods 700, 800, multiplied by the integral term constant Ki, and added to the integral term calculated from the present phase error. The present phase error may be the phase error determined by the measured phase difference $\phi_m$ and the target phase difference $\phi t$ as the measured phase difference $\phi_m$ is received by the meter electronics 20.

In another example, the methods 700, 800 may store one or more prior measured phase differences $\phi_m$ in the meter electronics 20. The methods 700, 800 may obtain the one or more prior measured phase differences $\phi_m$ and calculate the one or more prior phase errors that correspond to the one or more prior measured phase differences $\phi_m$. The one or more prior phase errors may be multiplied with the integral term Ki and then added to the present integral term. The present integral term may be determined as the meter electronics 20 receives the measured phase difference $\phi_m$ via the leads 100.

In an embodiment, one prior integral term may be employed. That is, the present phase error is multiplied by the integral term Ki and then added to the one prior integral term that is, for example, stored in the meter electronics 20. In an embodiment, the integral term may be calculated by equation:

integral term=integral term+phase error×Ki.  (5)

The phase error on the right side of equation (5) may be a present determined phase error that is calculated from that measured phase difference $\phi_m$ as the drive signal and the vibration signal are received by the meter electronics 20. The integral term on the right side of equation (5) may be a prior integral term that was calculated from the prior phase error. The integral term on the left side of equation (5) may therefore be the present integral term.

The present integral term may be stored by the methods 700, 800 in the meter electronics 20 for subsequent iterations of the control loop. For example, the integral term on the left side of equation (5) may be stored in the meter electronics 20 so that a subsequent calculation of equation (5) can employ the stored integral term on the right side of equation (5). Other methods of calculating the vibration control terms may be employed in alternative embodiments.

The methods 700, 800 may also generate a command frequency $\omega_c$ based on the determined phase error and provide the command frequency $\omega_c$ to a signal generator that is configured to generate the drive signal that vibrates the vibratory element at the command frequency $\omega_c$. According to an embodiment, the command frequency $\omega_c$ is generated using the integral term and the proportional gain term. The command frequency ex may be generated using the integral term and the proportional gain term by adding the integral term and the proportional gain term based on the equation:

command frequency=integral term+proportional gain term.  (6)

As can be appreciated, the command frequency $\omega_c$ may be generated by the meter electronics 20 described in the foregoing, although any meter electronics may be used in alternative embodiments. Accordingly, the meter electronics 20 may be configured to generate a command frequency $\omega_c$ based on the determined phase error and provide the command frequency $\omega_c$ to a signal generator 147c that is configured to generate the drive signal that vibrates the vibratory element 104 at the command frequency $\omega_c$. Other configurations may be employed in alternative embodiments.

The embodiments described in the foregoing provide a method 700, 800 and a meter electronics 20 for controlling a vibration of a vibratory element 104 based on a determined phase error. As explained in the foregoing, the method 700, 800 and meter electronics 20 may provide a drive gain that is based on the determined phase error. The drive gain is therefore large when the error is large and small when the error is small. The drive gain therefore causes the drive signal to more rapidly approach the first and second off-resonant frequencies $\omega 1$, $\omega 2$. Accordingly, the viscosity and density of a material being measured may be measured more quickly. In addition, because the drive gain is small when the error is small, the drive signal may be stable when the drive signal is at the first and second off resonant frequencies $\omega 1$, $\omega 2$.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments are described herein for illustrative purposes, various equivalent modifications are possible within the scope of the present description, as those skilled in the relevant art will recognize. The teachings provided herein can be applied to other methods and apparatuses for controlling a vibration of a vibratory sensor based on a phase error, and not just to the embodiments described above and shown in the accompanying figures. Accordingly, the scope of the embodiments described above should be determined from the following claims.

We claim:

1. A method of controlling a vibration of a vibratory element based on a phase error, the method comprising:
   vibrating the vibratory element with a drive signal;
   receiving a vibration signal from the vibratory element;
   measuring a phase difference between the drive signal and the vibration signal;
   determining a phase error between an off-resonance target phase difference and the measured phase difference; and
   calculating one or more vibration control terms with the determined phase error wherein the step of determining the phase error comprises calculating the phase error based on the equation:

phase error=target phase difference−measured phase difference/target phase difference.

2. The method of claim 1, wherein the one or more vibration control terms is a term in a proportional-integral control loop.

3. The method of claim 1, wherein the one or more vibration control terms is a proportional gain term for the proportional-integral control loop that receives the determined phase error.

4. The method of claim 3, wherein the proportional gain term is calculated based on the equation:

proportional gain=determined phase error×Kp;

wherein Kp is a proportional gain constant.

5. The method of claim 1, wherein the vibration control term is an integral term for a control loop that receives the determined phase error.

6. The method of claim 5, wherein the integral term is calculated based on the equation:

integral term=integral term+determined phase error×Ki;

wherein Ki is an integral term constant.

7. The method of claim 1, further comprising generating a command frequency based on the determined phase error and providing the command frequency to a signal generator that is configured to generate the drive signal that vibrates the vibratory element at the command frequency.

8. The method of claim 7, wherein the command frequency is generated using an integral term and a proportional gain term.

9. The method of claim 8, wherein the command frequency is generated using the integral term and the proportional gain term by adding the integral term and the proportional gain term based on the equation:

command frequency=integral term+proportional gain term.

10. A meter electronics (20) for controlling a vibration of a vibratory element (104), the meter electronics (20) comprising:
a driver circuit (138) coupled to the vibratory element (104), the driver circuit (138) configured to provide a drive signal to a vibratory element (104); and
a receiver circuit (134) coupled to the vibratory element (104), the receiver circuit (134) configured to receive a vibration signal from the vibratory element (104);
wherein the meter electronics (20) is configured to:
measure a phase difference between the drive signal and the vibration signal;
determine a phase error between an off-resonance target phase difference and the measured phase difference; and
calculate one or more vibration control terms with the determined phase error wherein the step of determining the phase error comprises calculating the phase error based on the equation:

phase error=target phase difference−measured phase difference/target phase difference.

11. The meter electronics (20) of claim 10, wherein the one or more vibration control terms is a term in a proportional-integral control loop.

12. The meter electronics (20) of claim 10, wherein the one or more vibration control terms is a proportional gain term for the proportional-integral control loop that receives the determined phase error.

13. The meter electronics (20) of claim 12, wherein the proportional gain term is calculated based on the equation:

proportional gain=determined phase error×$Kp$;

wherein Kp is a proportional gain constant.

14. The meter electronics (20) of claim 10, wherein the vibration control term is an integral term for a control loop that receives the determined phase error.

15. The meter electronics (20) of claim 14, wherein the integral term is calculated based on the equation:

integral term=integral term+determined phase error× $Ki$;

wherein Ki is an integral term constant.

16. The meter electronics (20) of claim 10, wherein the meter electronics (20) is further configured to generate a command frequency ($\omega_c$) based on the determined phase error and provide the command frequency ($\omega_c$) to a signal generator (147c) that is configured to generate the drive signal that vibrates the vibratory element (104) at the command frequency ($\omega_c$).

17. The meter electronics (20) of claim 16, wherein the command frequency ($\omega_c$) is generated using an integral term and a proportional gain term.

18. The meter electronics (20) of claim 17, wherein the command frequency ($\omega_c$) is generated using the integral term and the proportional gain term by adding the integral term and the proportional gain term based on the equation:

command frequency=integral term+proportional gain term.

* * * * *

UNITED STATES PATENT AND TRADEMARK OFFICE
CERTIFICATE OF CORRECTION

PATENT NO. : 10,663,386 B2
APPLICATION NO. : 15/528902
DATED : May 26, 2020
INVENTOR(S) : Andrew S Kravitz and Craig B McAnally Page 1 of 1

It is certified that error appears in the above-identified patent and that said Letters Patent is hereby corrected as shown below:

In the Specification

Column 1, Line 60, replace "or 3 dB frequencies." with -- or 3dB frequencies. --.

Column 13, Line 39, replace "command frequency ex" with -- command frequency $\omega_c$ --.

Signed and Sealed this
Tenth Day of November, 2020

Andrei Iancu
*Director of the United States Patent and Trademark Office*